J. KELLEY.
SWINGLETREE.
APPLICATION FILED NOV. 16, 1916.

1,232,809.  
Patented July 10, 1917.

Witnesses  
Leo Hampel  
Peter Haenel

John Kelley  
Inventor:

UNITED STATES PATENT OFFICE.

JOHN KELLEY, OF BIGELOW, ARKANSAS.

SWINGLETREE.

1,232,809.  Specification of Letters Patent.  Patented July 10, 1917.

Application filed November 16, 1916. Serial No. 131,644.

*To all whom it may concern:*

Be it known that I, JOHN KELLEY, a citizen of the United States, residing at Bigelow, in the county of Perry and State of Arkansas, have invented certain new and useful Improvements in Swingletrees, of which the following is a specification.

The present invention has for its object the provision of a novel type of swingletree designed particularly for use in the cultivation of orchards, vineyards, and other growing crops.

More specifically the swingletree embodying my invention is so formed as to constitute fenders adapted to prevent barking of trees and hanging or breaking of foliage between which the implement to which the device is attached may be operated. It may here be explained that in the well known constructions of swingle or double trees the bar members are straight or substantially so, the ends being provided with attaching members for the harness traces and in the use of such constructions, these hooks and ends catch in the foliage or engage trees or fences adjacent to which the implement is moved, with the result of breakage of the harness at times, or draft connection, or damage to the growths as above referred to. It is to eliminate these disadvantages that my invention is designed.

For a full understanding of the present invention, reference is to be had to the following description and the accompanying drawing, in which.

Figure 1:
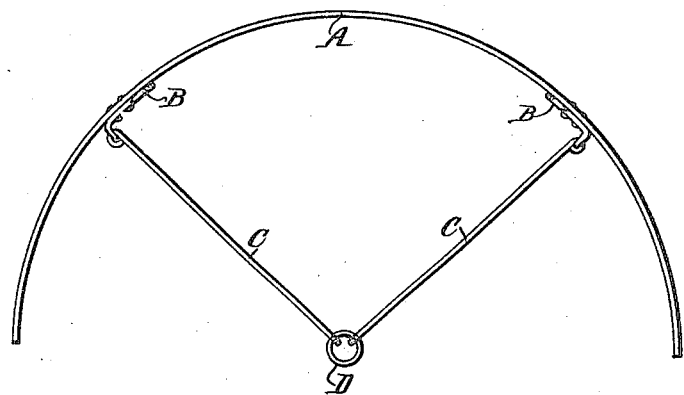
Figure 1 is a top plan view of a device constructed in accordance with my invention.
Figure 2:
Fig. 2 is a rear elevation of the same.

Referring to the drawing, A designates a bar which is bent or curved into substantially semicircular form so that the ends thereof point rearwardly. Adjacent to said ends and in spaced relation are fixedly secured to said bar the hook devices B, the forward upturned extremities of which provide attaching connections for the harness traces and the rearward extremities of which have connected thereto the connecting rods or links C, the latter in turn being connected at their rear extremities by a ring member D which is provided for attaching the swingle tree to the implement or vehicle as the case may be.

It will be observed that the forward face of the bar A is perfectly smooth, that is, it has no projections or obstructions thereon which might engage with objects in the use of the device. Obviously these objects when impinged by the bar A will readily slide around the surface of the same, if the objects are movable or if immovable the bar itself will shift and slide off of the surface without difficulty. The ends of the draft device thus constitute fenders and since the article is made of metal it is readily formed into its particular shape and it may be cheaply manufactured. While I have shown the invention as embodied in a swingletree, it is apparent that doubletrees might readily be made in the same form.

Having thus described my invention, what I claim as new is:

1. A draft device of the class described comprising a bar of substantially semicircular form, the end portions of which constitute fenders, and draft connection members attached thereto in spaced relation.

2. A draft device of the class described comprising a bar of curved configuration, the end portions of which extend rearwardly to provide fenders, said bar having its face unobstructed with respect to projections, and a draft connection attached to the rear face of the bar.

3. A swingletree consisting of a bar bent into semicircular form, the end portions projecting rearwardly, connecting members fixedly secured to the rear face of the bar and comprising trace attaching hooks at one end, and connecting rods attached to the other end to provide a draft connection for the implement to which the swingletree is attached.

In testimony whereof I affix my signature in the presence of two witnesses.

JOHN KELLEY.

Witnesses:
 LEO HAMPEL,
 PETER HAMPEL.

Copies of this patent may be obtained for five cents each, by addressing the "Commissioner of Patents, Washington, D. C."